United States Patent [19]

Wössner et al.

[11] 4,238,009
[45] Dec. 9, 1980

[54] VIBRATION DAMPER FOR VEHICLES

[75] Inventors: Felix Wössner, Schweinfurt; Günther Handke, Euerbach, both of Fed. Rep. of Germany

[73] Assignee: Fichtel & Sachs AG, Schweinfurt, Fed. Rep. of Germany

[21] Appl. No.: 935,877

[22] Filed: Aug. 23, 1978

[30] Foreign Application Priority Data

Sep. 17, 1977 [DE] Fed. Rep. of Germany ....... 2741998

[51] Int. Cl.³ ............................ F16F 9/06; F16F 9/54
[52] U.S. Cl. ...................................... 188/315; 92/128; 188/322
[58] Field of Search .............. 188/269, 315, 318, 322; 267/64 R; 92/128; 220/306, 308

[56] References Cited

U.S. PATENT DOCUMENTS

| 2,498,802 | 2/1950 | Funkhouser | 188/322 |
|---|---|---|---|
| 3,096,897 | 7/1963 | Hansen | 220/306 |
| 3,179,054 | 4/1965 | Arndt et al. | 92/128 |
| 3,315,402 | 4/1967 | Scott et al. | 220/306 |
| 3,429,980 | 2/1969 | Guttmann | 220/306 |
| 3,490,564 | 1/1920 | DeKoning et al. | 188/315 |
| 3,618,928 | 11/1971 | Taylor | 188/315 |
| 3,650,182 | 3/1972 | Phillips | 92/128 |
| 4,113,071 | 9/1978 | Muller et al. | 267/64 R |
| 4,125,060 | 11/1978 | McGee et al. | 92/128 |

FOREIGN PATENT DOCUMENTS

D21048 3/1956 Fed. Rep. of Germany ........... 188/322
661269 11/1951 United Kingdom ..................... 188/322

Primary Examiner—Edward R. Kazenske
Attorney, Agent, or Firm—Toren, McGeady and Stanger

[57] ABSTRACT

In a vibration damper or shock absorber for a vehicle, an axially extending cylinder is positioned within a similarly axially extending container with an annular reservoir formed between them. A piston rod extends through a guide in one end of the cylinder and includes a piston axially slidable within the cylinder for dividing it into a pair of working spaces interconnected through a damping device in the piston. One of the working spaces is in fluid connection with the reservoir. A connection is provided between the piston rod guide and the container and includes an annular groove in the guide and a projection from the container extending into the groove. Further, a sealing ring is provided between the guide and the container axially outwardly from the projection-groove. A certain amount of axial play is afforded between the container and the piston rod guide.

11 Claims, 8 Drawing Figures

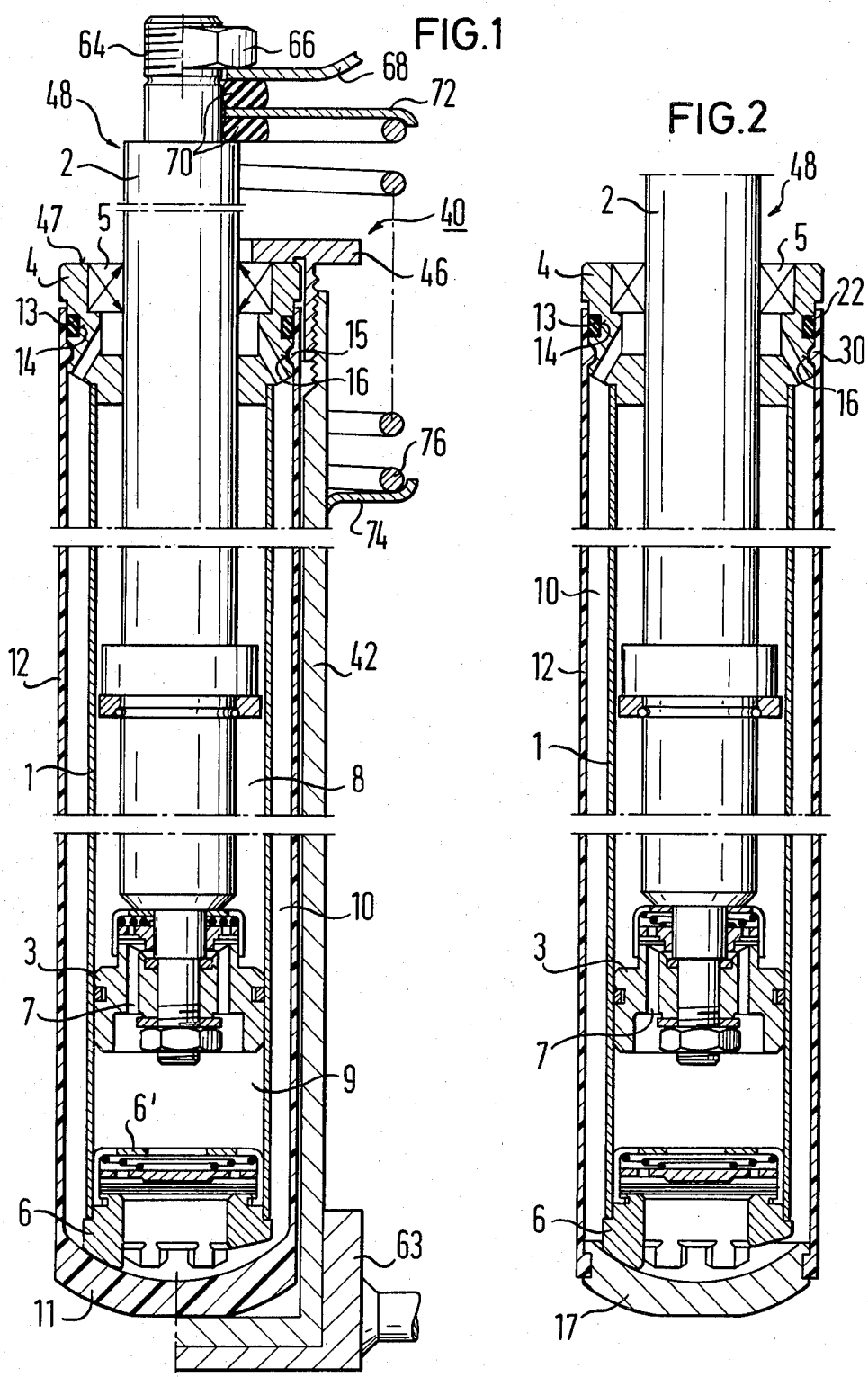

VIBRATION DAMPER FOR VEHICLES

SUMMARY OF THE INVENTION

The present invention is directed to a vibration damper or shock absorber for vehicles and includes a cylinder in which a piston is axially slidable with a rod connected to the piston and extending out of one end of the cylinder. The piston divides the interior of the cylinder into two working spaces filled with fluid and the working spaces are interconnected by a damping device located in the piston. An axially extending container laterally encloses and is spaced outwardly from the cylinder forming an annular space therebetween which acts as a reservoir. The container is sealingly connected to the piston guide rod and the opposite end of the cylinder from the piston guide rod is supported in the axial direction by the base of the container.

For the assembly and closing of vibration dampers of this general type a flange is provided at the end of a metal container tube or it is provided with a screw connection. In such an arrangement, the shock absorber is heavy, because the container tube must be constructed of a relatively thick wall. Particularly where such vibration dampers are used as inserts in shock-absorbing struts, the closure of the damper by means of rolling or screwing is disadvantageous because the force required for fastening the tube of the shock-absorbing strut is distributed over the container as well as the inner cylinder. Such inserts in shock-absorbing struts are usually fastened in the strut tube by means of a fastening screw. To guarantee a problem-free seal for the damper compensating space at the points where the cylinder is fixed to the shock absorber, that is, to ensure that no additional and uncontrollable cross-sections for flow are provided between the working spaces and the compensating space, in such inserts a high tightening torque of the fastening screw at the strut tube is required. In addition to other problems, such a high tigtening torque has the disadvantage that a small amount of rust is sufficient to make it very difficult or practically impossible to loosen the fastening nut at the strut tube when it is necessary to exchange the strut insert.

It is the primary object of the present invention to provide a vibration damper in which the container is connected in a simple and easy manner and the damper is light in weight and is particularly suited for use as an insert in a shock-absorbing strut and assures problem-free operation when a low tightening torque is applied to the screw connection of the strut.

In accordance with the present invention, the container and the piston rod guide are interengaged by a snap-like connection which consists of an indentation in one of them and a projection on the other extending into the indentation. This type of connection leads to a very simple fastening of the container to the piston guide rod and, further, permits the use of a container sleeve or tube which is light in weight, particularly if the vibration damper is to be used as an insert for shock-absorbing struts.

In addition, when the vibration damper is used as an insert for struts, it is ensured that the tightening torque of the strut connection acts only against the base of the container through the piston rod guide, the cylinder and the cylinder base. As a result, a problem-free sealing of the working spaces along with the reservoir is achieved by means of a slight tightening torque on the screw connection of the strut.

In one embodiment of the invention, the indentation is formed in the circumferential periphery of the piston rod guide and consists of an annular groove while the projection, interengaging the groove, is formed radially inwardly from the container. The projection can be formed as several equi-angularly spaced projections about the inner circumference of the container or as an inwardly directed annular projection.

In the present invention, particularly where it is used as an insert for a strut, a relatively large amount of weight can be saved if the container is formed as a unitary member of a plastics material.

Alternatively, the base of the container, that is its end opposite the connection to the piston guide rod, can be a metal part if very high forces act on the base. An axially extending tube of plastics material can be sprayed on to the metal part. To facilitate the connection of such a plastics material tube with the container base, the base is provided with identations before the material is sprayed. Such indentations assure a problem-free connection between the metal base and the plastics material sleeve.

In another embodiment of the invention, the interconnection of the sleeve portion of the container to its base can be effected in a simple manner by providing the base with a groove and the sleeve-like portion with at least one projection for engagement in the groove.

Further, a problem-free sealing is afforded between the container and the piston rod guide by positioning a sealing ring within the groove in the guide which receives the projection on the container or by providing a separate groove on the guide in which a sealing ring is seated. A cylindrical portion of the container extending axially from the projections to its adjacent end serves as a contact surface against the sealing ring for completing the sealing action.

In still another embodiment of the invention, the mounting of the sleeve-like portion of the container on the piston guide rod is achieved by means of an oblique surface provided on the container projection with this surface facing toward the adjacent end of the container. To permit transmission of even higher tensile forces between the container and the piston rod guide, the projection on the container can be provided with an obliquely disposed undercut surface on the side which faces away from the adjacent end of the container and the indentation in the piston guide rod is similarly undercut. In such an arrangement, the projection from the container hooks into the indentation in the piston rod guide when a tensile load is applied and a radially inwardly directed force component of the tensile force is created at the point of connection.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 1 is an axially extending sectional view of a vibration damper acting as an insert in a shock-absorbing strut;

FIG. 2 is a view similar to FIG. 1 in which the container base of the vibration damper is formed as a metal part to which a plastics material tube is attached;

DETAIL DESCRIPTION OF THE INVENTION

Figure 3:
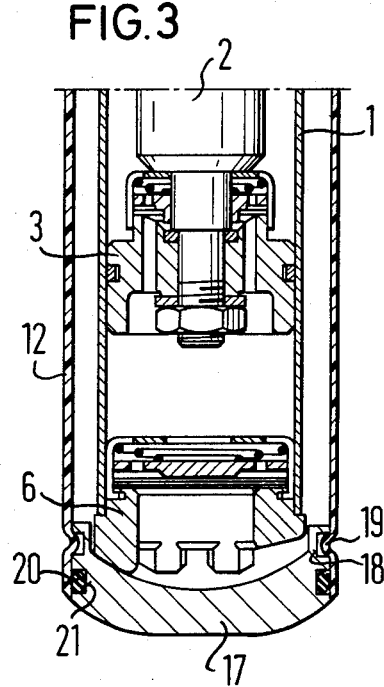
FIG. 3 is a partial axially extending sectional view of the vibration damper in which the metal container base is connected to the sleeve-like portion by a snap-connection.

In FIG. 1 a vibration damper is illustrated acting as an insert 48 for a shock-absorbing strut 40 and including an axially extending cylinder 1 containing a piston 3 which is axially movable within the cylinder with a piston rod 2 connected to the piston and extending upwardly out of the upper end of the cylinder. At the upper end of the cylinder 1, the piston rod 2 extends through a piston rod guide 4 and a piston rod seal 5 is seated in the guide and contacts the outer surface of the rod affording a seal for the interior of the cylinder. An axially extending container 12 laterally encloses the cylinder 1 and the inner surface of the container is spaced outwardly from the outer surface of the cylinder forming an annular compensating space 10 therebetween. At its upper end, the cylinder 1 is centered in the piston rod guide 4 and at its lower end the cylinder base 6 bears against the base 11 of the container. The piston 3 divides the interior of the cylinder 1 into an upper working space 8 and a lower working space 9 with a damping device 7 in the piston affording fluid connection between the working spaces. A valve unit 6' is located in the cylinder base 6 affording the interconnection of the lower working space 9 with the compensating space 10. In FIG. 1, the container base 11 is formed integrally with the axially extending sleeve-like portion of the container 12 and the entire container is constructed of a plastics material. At its upper end, container 12 is fastened on to the piston rod guide 4 by means of an inwardly extending projection 15 on the container which fits into an indentation or recess 16 in the outer circumferential surface of the piston rod guide 4. Above the indentation 16, a groove 14 is formed in the outer circumferential surface of the guide 4 and it seats a sealing ring 13. When the container 12 is mounted on the piston rod guide 4, an axially extending cylindrical portion extending upwardly from the projection 15 presses against the sealing ring 13 and seals the compensating space 10 from the outside. In this embodiment, the indentation 16 is in the form of an annular groove in the surface of the guide 4, while the projection 15 formed inwardly from the container 12 consists of a plurality of equi-angularly spaced projections located about the inner circumferential surface of the container.

As shown in FIG. 1, the shock-absorbing strut insert 48 is mounted in the shock-absorbing strut 40. A strut tube 42 encloses the container 12 and a fastening nut 46 threaded into the upper end of the strut tube 42 presses in the axial direction against the piston rod guide 4. As a result, the force exerted by the screw connection of the strut is transmitted through the piston rod guide 4, the cylinder 1 and the cylinder base 6 to the container base 11 with the opposite ends of the cylinder 1 pressed against the piston rod guide at the upper end and against the cylinder base 6 at the lower end affording a problem-free sealing between the working spaces 8 and 9 and also between the working space 9 and the reservoir or compensating space 10. The inner diameter of the strut tube 42 is adjusted to the outer diameter of the container 12 so that the container is held in the strut tube with very little, if any, play and a satisfactory heat transfer takes place between the container and the strut tube. This type of mounting of the strut insert 48 makes it possible to provide a very thin wall for the container 12, since the strut tube 42 has a high resistance against bending. Accordingly, the choice of materials for forming the container 12 and its use of thin walls permits an extremely advantageous weight of the vibration damper. Due to the support action of the strut tube 42, it is possible to keep the container walls extremely thin even if a metal container 12 is used. As a result, even if such a metal container is used, a significant weight reduction is possible for the vibration damper as compared to conventional designs.

In FIG. 2 the difference from the embodiment shown in FIG. 1 involves the construction of the container 12 having a metal container base 17 and a plastics material sleeve-like portion connected to the base. For a problem-free connection and seal, the base 17 is provided with a groove about its circumferential periphery forming the point of connection for the sleeve-like portion. At the upper end of the sleeve-like portion of the container 12, a circular projection 30 extends inwardly into engagement with an annular groove 16 formed in the outer circumferential periphery of the piston rod guide 4. As in FIG. 1, the embodiment in FIG. 2 includes a sealing ring 13 seated in a groove 14 so that after mounting the container 12 on the piston rod guide 4, its cylindrical portion 22 extending upwardly from the projection 16 presses against the sealing ring 13 and assures a seal for the container from the ambient atmosphere.

Figure 4:
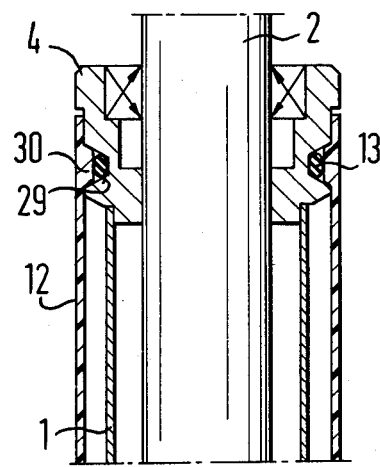
FIG. 4 is a partial axially extending sectional view illustrating the connection between the container and piston rod guide wherein the connecting groove serves as a seat for a sealing ring.

In FIG. 3 another arrangement is shown for securing the lower end of the sleeve-like portion of the container 12 to the container base 17. In this embodiment, the base 17 has a fastening groove 18 about its circumferential periphery with a fastening projection 19 formed in the container 12 in engagement within the groove. To seal the bottom of the container 12 from the outside, its base has a sealing groove 21 spaced axially downwardly from the fastening groove 18. A sealing ring 20 is seated in the sealing groove 21 and is pressed by the cylindrical portion of the container extending downwardly from the projection 19. Another type of fastening between the piston guide rod 4 and the container 12 is shown in FIG. 4. In this embodiment, an indentation or groove 29 formed in the circumferential periphery of the guide 4 serves as a seat for the sealing ring 13 and also receives the annular projection 30 which contacts the sealing ring when the guide and container are connected together. Accordingly, the groove 29 has a double function in holding the sealing ring and axially fixing the position of the container 12.

Figure 5:
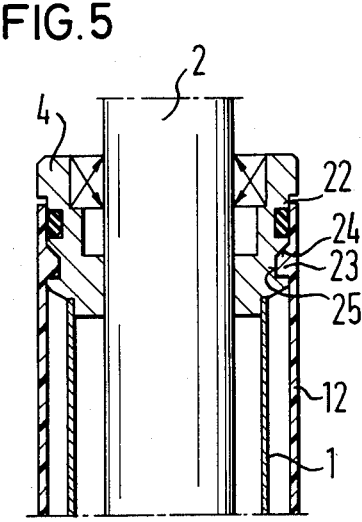
FIG. 5 is a partial axially extending sectional view of another embodiment of the connection between the container and the piston rod guide.
Figure 6:
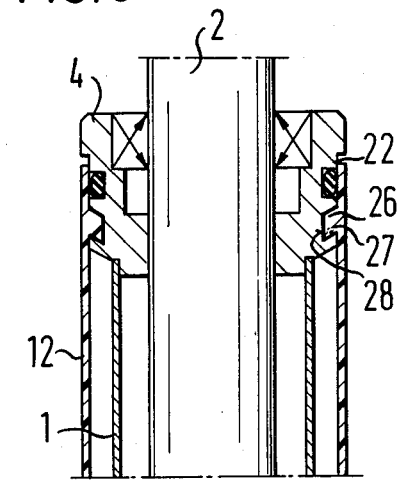
FIG. 6 is a partial axially extending sectional view, similar to FIG. 5, of still another embodiment of the connection between the container and the piston rod guide where the connecting portions hook one into the other when a tensile load is applied.

The arrangement in FIG. 5 differs from the above-described embodiments in that a projection 23 extending inwardly from the container 12 has a surface 24 closer to the adjacent end of the container extending obliquely of the axis of the cylinder 1. The container has a cylindrical portion 22 extending from the projection to the adjacent end of the container. The surface 24 is inclined from its radially inner end to the cylindrical portion 22 toward the adjacent end of the container. Groove 25 in the outer circumferential periphery of the piston rod guide rod 4 is shaped to receive the shaped projection 23 and the groove is dimensioned to allow a small axial movement of the projection 23 in the groove 25. The radially extending lower edges of the projection 23 and the groove 25 allow relatively high tensile forces to be developed between the container 12 and the piston rod guide 4 without the connection between these two elements being loosened by such forces. The interconnection between container 12 and piston rod guide 4 as shown in FIG. 6 is capable of transmitting even higher tensile forces. To provide this characteristic, a projection 26 is formed with an undercut oblique surface 27, that is, the surface more remote from the adjacent end of the container, and the groove 28 in the piston rod guide is shaped accordingly. As a result, when an axial tensile load is applied, the interconnection between the piston rod guide 4 and the container 12 causes the projection 26 to be hooked into the groove or recess 28. The tensile force acting on the surface 27 extending obliquely of the cylinder axis causes a radially inwardly directed force component acting on the projection 26.

Figure 7:
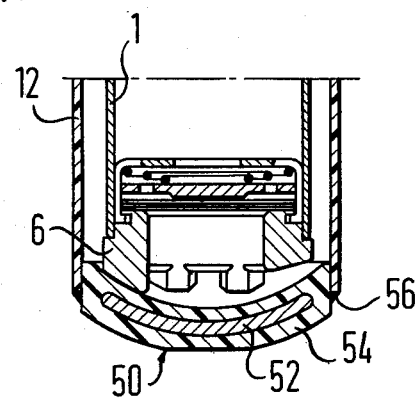
FIG. 7 is a partial axially extending sectional view of a further embodiment of the present invention illustrating a plastics material covered container base welded to an axially extending sleeve-like portion of the container.

In the embodiment illustrated in FIG. 7, the bottom of the container 12 includes a base 50 made up of a bending-resistant metal insert 52 enclosed in a plastics material 54 so that the sleeve-like portion of the container 12 formed of a plastics material can be welded to the base by means of a welding seam 56. Metal insert 52 increases the strength of the container base 50 permitting it to withstand higher forces. Due to the use of welding, a stable connection is provided between the two parts of the container and the interior of the container is sealed from the outside.

Figure 8:
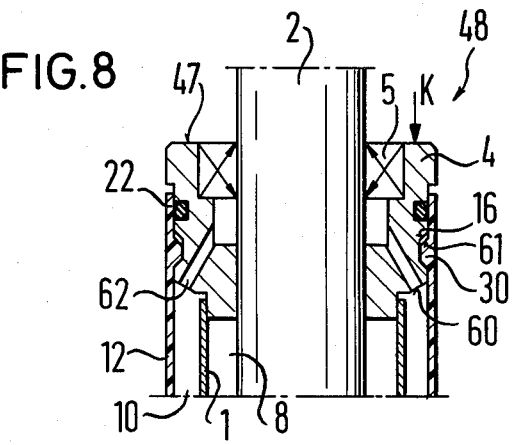
FIG. 8 is an enlarged detail view of the upper end of FIG. 2.

FIG. 8 displays a snap-like connection between the container 12 and the piston rod guide 4 of the shock-absorbing strut insert 48, such as shown in FIG. 2. The assembly of the strut insert is facilitated by a frusto-conically shaped portion 60 on the lower side of the piston rod guide 4. Portion 60 serves as a guide surface for the plastics material container 12 and its inwardly directed projection 30 during engagement with the guide. As soon as the projection 30 and its surface 61, which is inclined in the same direction as the frusto-conical portion 60, makes contact with such portion it is pressed against the latter in the axial direction with the plastics material container 12 expanding elastically until the projection 30 snaps into the annular groove 16. The compensating space or reservoir 10 is sealed from the working spaces 8, 9, when the cylinder 1 is axially prestressed between the piston rod guide 4 and the cylinder base 6. The axial prestressing force is exerted by the fastening nut 46 when the strut insert 48 is mounted in the strut 40 with the fastening nut pressing against the outer end face 47 of the piston rod guide 4. To ensure that the pressing force acts directly on the cylinder 1 and is not partially transmitted through the container 12, the connection between the guide 4 and the container 12 has a certain amount of axial play. In FIG. 8, the strut insert 48 is shown before it is mounted in the strut. In this arrangement, the cylinder does not have its upper end in contact with the piston rod guide 4 and, as a result, there is no sealing action between the working spaces and the reservoir 10. When the fastening nut exerts an axial force, note arrow K in FIG. 8, on the piston rod guide 4 as the insert 48 is placed in the strut 40, the piston rod guide moves without restriction relative to the container 12 in the direction of the applied force so that a sealing action between the reservoir 10 and the working spaces 8, 9 is assured with the application of a relatively low force by the fastening nut 46. Because of the axial play involved, it is possible to allow wider finishing tolerances for the dimensions of the components, these tolerances determining the position of the projection 30 within the indentation or recess 16 of the assembled arrangement. Further, FIG. 8 illustrates a connecting passageway 62 between the reservoir or compensating space 10 and the seal 5 for the piston rod. This connecting passageway 62 ensures that the pressure of the compensating space 10 acts against one side of the seal 5 affording the sealing action with the piston rod 2.

In FIG. 1 a simplified showing is provided of a shock-absorbing strut located in a motor vehicle. At its lower end, the strut tube 42 enclosing the strut insert 48, is rigidly connected to a steering knuckle 63 connected, in turn, to a vehicle wheel, not shown. The upper end of piston rod 2 is provided with a thread 64 and is fastened to a plate 68 of the vehicle by means of a nut 66. A first spring plate 72 is supported by the plate 68 in a rubber bearing 70. A second spring plate 74 is rigidly connected to the strut tube in axially spaced relation to the first spring plate. Extending between the two spring plates 72, 74 is a compression spring 76 which provides the spring suspension of the vehicle wheel relative to the plate 68. The spring action is dampened by the strut insert 48. When the piston rod moves into the cylinder 1, fluid flow from the working space 9 passes through the damping device 7 into the working space 8 and also passes through the bottom valve unit 6' in the cylinder base 6 into the reservoir 10. When the piston rod is moved outwardly from the cylinder, the flow of fluid is reversed. The bottom valve unit 6' and the damping device 7 are dimensioned so that the throttling of the fluid flow and, accordingly, the dampening of the piston rod during its inward movement is carried out mainly by the bottom valve unit 6 while the damping device 7 affords the main dampening action of the outward movement of the piston rod 2.

While specific embodiments of the invention have been shown and described in detail to illustrate the application of the inventive principles, it will be understood that the invention may be embodied otherwise without departing from such principles.

What is claimed is:

1. Vibration damper, such as used in a vehicle, includes an axially extending cylinder having a first end and a second end, a piston rod extending into the first end of said cylinder, a piston connected to said piston rod and located within said slidably displaceable through said cylinder, said piston transversely dividing the interior of said cylinder into a first working space between said piston and the first end of said cylinder and a second working space between said piston and the second end of said cylinder, said first and second working spaces are arranged to contain a fluid, a damping device located in said piston and interconnecting said first and second working spaces for affording the flow of fluid between said working spaces, an axially extending sleeve-like container laterally enclosing said cylinder and forming an axially extending annular reservoir therebetween with said reservoir arranged to be filled partly with a liquid and partly with gas, said reservoir being in fluid connection with the second working space in said cylinder, said container having a first end adjacent the first end of said cylinder and a second end adjacent the second end of said cylinder, a piston rod guide fitted into and closing the first end of said cylinder and into fitted into and sealing the first end of said container, said piston rod extending through said piston rod guide into said cylinder, said container including a transverse member closing off the second end of said container and extending transversely of the axis of said cylinder, the second end of said cylinder supported against said transverse member so that in the axial direction said cylinder is supported between said piston rod guide and said transverse member, wherein the improvement comprises that said container being formed at least at the first end thereof of a radially elastically expandable material, said piston rod guide and container are interengaged by a snap-like connection so that said piston rod guide and said container are movably displaceable in the axial direction of said cylinder relative to one another during assembly for a portion of the axial length of said container from the first end thereof before the snap-like connection is established, the snap-like connection comprises a projection formed on and extending radially from one of said container adjacent to the first end thereof and said piston rod guide and an indentation formed in the outer one of said container adjacent to the first end thereof and said piston rod guide, with said projection extending into said indentation and forming the snap-like connection between said container and said piston rod guide, said projection and indentation being dimensioned in the axial direction so that a certain amount of axial play is provided between said container and piston rod guide when the snap-like connection is effected, and means for applying an axially directed force between said piston rod guide and said container comprising first means for applying an axially directed force to said piston rod guide with the force directed toward the second end of said container and second means for applying an axially directed force to the second end of said container directed toward the first end thereof so that due to the axial play a significant axial force is not applied to the axially extending portion of said container and the axially directed force is directed through said cylinder.

2. Vibration damper, as set forth in claim 1, wherein said piston rod guide has a radially inner and a radially outer circumferential periphery, said indentation comprises a first annular groove formed in and extending around the radially outer circumferential periphery of said piston rod guide, said projection formed radially inwardly from said container and projecting into said annular groove.

3. Vibration damper, as set forth in claim 2, wherein said projection comprises a plurality of equi-angularly spaced projections spaced apart on the inner circumferential surface of said container.

4. Vibration damper, as set forth in claim 2, wherein said container is formed of a plastics material for its full axial extent and said transverse member is formed integrally with the axially extending portion of said container.

5. Vibration damper, as set forth in claim 2, wherein said transverse member comprises a metal insert enclosed in a plastics material, said sleeve-like container is formed of a plastics material for its full axial extent and said transverse member and said sleeve-like container are welded together.

6. Vibration damper, as set forth in claim 2, wherein said transverse member is formed of a rigid material relative to said container and has a circumferentially extending surface thereon juxtaposed to the inner surface of said container adjacent the second end thereof, a groove formed into the circumferentially extending surface of said transverse member, said container adjacent the second end thereof having an inwardly directed projection in interconnecting engagement with said groove in said transverse member.

7. Vibration damper, as set forth in claim 2, wherein said container is formed for its full axial extent of an elastically expandable plastics material, said piston guide extending in the axial direction of said cylinder and having an end extending transversely of the axial direction of said cylinder which end enters first into the first end of said container before the snap-like connection is established, said end having an annular surface extending inwardly from the outer circumferential periphery of said piston rod guide and disposed at an oblique angle to the axis of said cylinder and in the assembled position said annular surface slopes inwardly toward the axis of said cylinder in the direction toward the second end of said cylinder, and said obliquely disposed annular surface having a radially outer diameter approximately equal to the inside diameter of said container and being spaced axially from said first annular groove so that as said annular surface rides over said projection said annular surface elastically expands said container before said projection enters into said first annular groove for forming the snap-like connection therebetween.

8. Vibration damper, as set forth in claim 7, wherein said piston rod guide has a second annular groove formed in and extending around the radially outer circumferentially periphery thereof with said second groove spaced axially from said first annular groove toward the first end of said container, a sealing ring seated within said second annular groove, and said container having an axially extending cylindrical section extending between the first end thereof and said projection formed therefrom and said cylindrical sections disposed in contacting engagement with said sealing ring for effecting a seal between said piston rod guide and said container.

9. Vibration damper, as set forth in claim 9, wherein said projection has a first surface facing toward the first end of said container and extending obliquely of the axis of said cylinder with said obliquely extending first surface sloping from the radially inner end thereof toward the first end of said container and outwardly from the axis of said cylinder.

10. Vibration damper, as set forth in claim 9, wherein said projection having a second surface facing away from the first end of said container and extending obliquely of the axis of said cylinder with said obliquely extending second surface from the radially inner end thereof toward the second end of said container and outwardly from the axis of said cylinder.

11. Vibration damper, as set forth in claim 7, wherein said projection comprises a first surface closer to the first end of said container and extending obliquely of the axis of said container inwardly from the inner surface of said container, a second surface extending parallel to the axis of said cylinder and located radially inwardly of the inner surface of said container and extending from the end of said first surface more remote from the first end of said container toward the second end of said container, and a third surface extending obliquely of the axis of said cylinder outwardly from said second surface and extending from the end of said second surface more remote from the first end of said container toward the second end of said container and terminating at the inner surface of said container.

* * * * *